United States Patent [19]
Le Comte et al.

[11] 3,787,913
[45] Jan. 29, 1974

[54] METHOD FOR MANUFACTURING WASHERS FROM A FLEXIBLE TUBE

[75] Inventors: Bernard Le Comte, Houilles; Jules Henry, Hillion; Roger Pincemin, Ploufragan, all of France

[73] Assignee: Le Joint Francais, Paris, France

[22] Filed: June 23, 1972

[21] Appl. No.: 265,886

[30] Foreign Application Priority Data
June 24, 1971 France .............................. 71.23095

[52] U.S. Cl. .................................. 10/86 B, 29/235
[51] Int. Cl. ...................... B21d 53/20, B23p 19/04
[58] Field of Search .......... 10/72 R, 73, 86 R, 86 B; 29/234, 235, 275, 450; 82/47, 82; 83/54, 179, 185, 186, 187; 85/50, 51

[56] References Cited
UNITED STATES PATENTS

| | | | |
|---|---|---|---|
| 861,666 | 7/1907 | Merritt | 29/235 |
| 894,221 | 7/1908 | Merritt | 29/235 |
| 1,037,159 | 8/1912 | Lorenz | 29/235 |
| 1,322,843 | 11/1919 | Townsend | 29/235 |
| 1,981,925 | 11/1934 | Russell et al | 29/275 |
| 2,298,183 | 10/1942 | Susen | 29/234 |
| 2,813,331 | 11/1957 | Hohl | 29/235 |
| 3,341,930 | 9/1967 | Belanger | 29/427 |

Primary Examiner—Charles W. Lanham
Assistant Examiner—E. M. Combs
Attorney, Agent, or Firm—Sughrue, Rothwell, Mion, Zinn and Macpeak

[57] ABSTRACT

A method for manufacturing washers from a flexible tube consisting in engaging a tube on a mandrel, cutting up the tube into washers and withdrawing the washers produced from the mandrel, is characterized in that the engaging of a new tube to be cut up is effected on the mandrel bearing the washers produced from the previously cut-up tube, the relative movement of that new tube on the mandrel simultaneously causing the removal of the washers borne by that mandrel.

4 Claims, 1 Drawing Figure

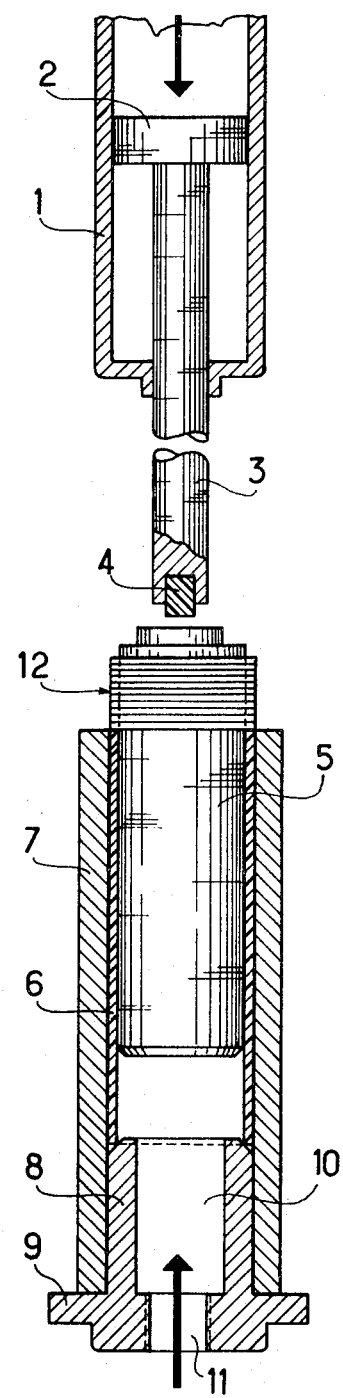

METHOD FOR MANUFACTURING WASHERS FROM A FLEXIBLE TUBE

BACKGROUND OF THE INVENTION

1. Field of the Invention

The present invention has for its object a method for manufacturing washers produced by cutting up a flexible tube; this method requires that each flexible tube be mounted on a mandrel with a view to cutting it up, and that the mandrel be separated from the washers formed.

2. Description of the Prior Art

In certain industrial processes such as, for example, the manufacturing of seals or washers by cutting up a tube made of india rubber or an elastomeric substance, the tube is previously arranged on a support generally consisting of a mandrel, and the cutting of the tube into washers having pre-determined dimensions is then effected, such washers being subsequently separated from the mandrel.

More particularly, to proceed with the installing of the tube on the mandrel, one of the ends of the tubes is previously fitted onto a cylinder and is held there, the mandrel is inserted in the other end of the tube; compressed air is blown through the axial bore of the cylinder and the mandrel is driven into the tube by any suitable means, the mandrel thus being progressively inserted into the tube. The end of the tube is subsequently separated from the cylinder.

Inasmuch as concerns the separating of the cut washers in a preceding cutting operation, the latter is effected, generally, by hand, using appropriate tools. That operation may also be effected mechanically in an independent work station.

Nevertheless, such processes have a certain number of disadvantages, more particularly, the lack of simultaneous operation when installing the tube on the mandrel, on the one hand, and separating the cut washers from the mandrel, on the other hand, causes great waste of time.

Moreover, the inserting of the tube on the cylinder and the withdrawal of the latter are generally effected by hand, this requiring great physical effort and an appreciable operating time.

Insufficient production rates, entailing a high unit cost price of the parts result from the above mentioned disadvantages.

The present invention enables such disadvantages to be overcome.

It has for its aim a method enabling the two preceding operations relating to the installing of a tube on a mandrel, and to the removal of the mandrel to be effected simultaneously, the method enabling very easy handling of the corresponding implementing device, and enabling a high production rate and great reliability to be attained.

SUMMARY OF THE INVENTION

The invention has for its object a method for manufacturing washers from flexible tubes, consisting in engaging a tube on a mandrel, cutting the tube while engaged on the mandrel into washers and withdrawing the washers produced from the mandrel. The invention is characterized in that the engaging of a new tube to be cut up is effected on the mandrel bearing washers produced from the previously cut up tube with the relative movement of that new tube on the mandrel simultaneously causing the removal of the washers borne by that mandrel.

BRIEF DESCRIPTION OF THE DRAWING

Other characteristics and advantages of the invention will become apparent from the following description give purely by way of illustration but having no limiting character, with reference to the single accompanying drawing which shows a sectional elevational view of an embodiment of the device ensuring the implementing of the method according to the invention.

DESCRIPTION OF THE PREFERRED EMBODIMENT

As it is shown in the accompanying drawing, the device comprises a double acting jack cylinder 1 whose piston 2 is fixed to a plunger rod 3, which is, to great advantage, provided at its free end with a shock absorber 4.

Furthermore, a mandrel 5 comprising washers 12 produced during a preceding cutting operation on a tube, and on which another tube 6 made of india rubber, for example, is to be installed may be driven inside the tube by means of the plunger rod 3. The tube 6 itself may be arranged with slight play inside a rigid sleeve 7 whose closed end comprises a cylinder 8 having a shoulder 9 for blocking the sleeve 7. Moreover, the bore 10 of said cylinder is made to communicate with a compressed air supply (not shown) by means of the passage 11.

The method according to the invention is effected as follows:

The plunger rod 3 being in the rest position inside the jack cylinder 1, the tube 6 made of india rubber is previously placed on V supports arranged between the jack cylinder 1 and the sleeve 7 (not shown) and is inserted in the sleeve 7 so that its end bears against the chamfered forward portion of the cylinder 8, as shown in the figure.

The mandrel 5 fitted with parts 12, such as washers or seals, made during a preceding cutting operation, is placed on the V supports and is engaged in the free end of the India rubber tube 6 and driven inside the tube until it abuts against the end of the cylinder 8, such a movement being caused by means of the plunger rod 3 moved by the jack cylinder 1. During the movement of the mandrel 5, compressed air is permanently blown into the tube 6 through the bore 10 of the cylinder 8, with the purpose of expanding the tube 6 and hence of causing the mandrel 5 to move. The accompanying drawing shows clearly that during the movement of the mandrel 5, the parts 12, which rest, as an assembly, against the end of the tube 6, slide progressively along the mandrel in an opposite direction to the movement of the latter, and are thus removed.

The last phase of such a process consists in bringing the plunger rod 3 of the jack cylinder 1 back to its original position; the result is that the compressed air leaving the bore 10 of the cylinder 8 drives the mandrel covered by the india rubber tube 6 inside the sleeve 7, where it is brought onto the previously mentioned V supports.

The mandrel is then directed towards a cutting device (not shown) where a new set of parts 12 is formed by cutting up the tube 6, and is again brought onto the V supports for the parts to be removed and a new tube to be brought into position, and so on.

The method and device which are objects of the invention may therefore be implemented each time flexible tubes, even having great bulk and/or weight, are to be cut up into numerous elements having various forms, in a minimum space of time, moreover, while requiring only limited labor having no special qualification.

They may be applied to particularly great advantage in the seal and washer industry.

It must be understood that the invention is in no way limited to the embodiment described, and illustrated, which has been given only by way of an example.

We claim:

1. In a method for manufacturing washers from flexible tubes including the steps of engaging a tube on a mandrel, cutting up said tube into washers while engaged on the mandrel, the improvement comprising the step of: sliding a new tube to be cut up onto the mandrel against the washers formed out of the previously cut tube to simultaneously remove the previously cut washers from the mandrel 2. The method according to claim 1, wherein said step further comprises blowing air into said tube during its relative movement onto the mandrel to force the simultaneous withdrawal of the washers borne by that mandrel.

3. The method according to claim 2, wherein said step comprises, in sequence, engaging said new tube to be cut up in a rigid sleeve having an inside diameter slightly greater than the diameter of the tube, and then inserting said mandrel into said tube while maintaining air pressure internally of said tube.

4. The method according to claim 3, wherein said step comprises, in sequence, blowing air into said new tube through the end of the sleeve opposite from the end of the tube in which the mandrel is engaged, engaging said tube on the mandrel, maintaining the air injection after the full engaging of that on the mandrel, and then removing from the sleeve the mandrel covered by the new tube.

* * * * *